United States Patent
Zell et al.

(10) Patent No.: US 11,268,812 B1
(45) Date of Patent: Mar. 8, 2022

(54) BIAS CORRECTED INERTIAL NAVIGATION SYSTEM

(71) Applicant: The United States of America as represented by the Secretary of the Navy, Newport, RI (US)

(72) Inventors: Eric J Zell, Scituate, MA (US); David J Bamford, Wakefield, RI (US); Ahmed S Zaki, Kingston, RI (US)

(73) Assignee: The United States of America as represented by the Secretary of the Navy

( * ) Notice: Subject to any disclaimer, the term of this patent is extended or adjusted under 35 U.S.C. 154(b) by 0 days.

(21) Appl. No.: 17/016,432

(22) Filed: Sep. 10, 2020

(51) Int. Cl.
*G01C 19/5776* (2012.01)
*G01C 19/72* (2006.01)

(52) U.S. Cl.
CPC ....... *G01C 19/721* (2013.01); *G01C 19/5776* (2013.01)

(58) Field of Classification Search
CPC ................ G01C 19/5776; G01C 19/721
See application file for complete search history.

(56) References Cited

U.S. PATENT DOCUMENTS

| | | | | |
|---|---|---|---|---|
| 5,331,404 A * | 7/1994 | Moeller | ............... | G01C 19/721 356/460 |
| 8,156,806 B1 * | 4/2012 | Cardarelli | ............... | G01C 21/16 73/511 |
| 8,239,162 B2 * | 8/2012 | Tanenhaus | ............... | G01C 21/16 702/151 |
| 10,989,535 B1 * | 4/2021 | Kim | ............... | G02B 6/4457 |
| 2009/0058345 A1 * | 3/2009 | Cooper | ............... | G05B 19/27 318/602 |
| 2010/0294039 A1 * | 11/2010 | Geen | ............... | G01C 19/5776 73/504.12 |
| 2014/0005975 A1 * | 1/2014 | Ruizenaar | ............... | G01C 19/56 702/150 |
| 2014/0036083 A1 * | 2/2014 | Vau | ............... | B60R 1/00 348/148 |
| 2016/0047675 A1 * | 2/2016 | Tanenhaus | ............... | G01C 25/005 702/104 |
| 2018/0128643 A1 * | 5/2018 | Ledroz | ............... | G01C 25/00 |
| 2018/0141641 A1 * | 5/2018 | Griffin | ............... | B64C 3/00 |
| 2019/0033076 A1 * | 1/2019 | Budin | ............... | G01C 21/165 |
| 2020/0217871 A1 * | 7/2020 | Mac | ............... | G01P 3/4802 |

* cited by examiner

*Primary Examiner* — David J Bolduc
(74) *Attorney, Agent, or Firm* — James M. Kasischke; Michael P. Stanley

(57) ABSTRACT

A method and system is provided for estimating and compensating for gyro bias in gyro-stabilized systems. The method includes comparing an output of a gyroscope to a reference measurement; estimating a bias of the gyroscope based on the comparison using a Kalman filter; and adjusting a control output of the gyro-stabilized system with the estimated bias to maintain a position of the gyro-stabilized system.

1 Claim, 3 Drawing Sheets

BIAS CORRECTED INERTIAL NAVIGATION SYSTEM

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION

(1) Field of the Invention

The present invention relates to compensating for bias in servo systems, and more particularly, to a method for use of a controller that compensates for gyroscope sensor bias in gyro-stabilized systems.

(2) Description of the Prior Art

Many imaging and communications systems use an inertial navigation system (INS) to stabilize payloads. Communication systems rely on accurate measurements over extended lengths of time to stabilize their antenna, while imaging systems rely on high-bandwidth sensors to stabilize vibration and/or rigid body motion. An INS can include three orthogonally mounted gyroscopes and three orthogonally mounted accelerometers, along with a computer processor unit. To calculate roll, pitch, and heading values of the platform; regular rate data from the INS gyroscopes is integrated over time.

However, inherent in these gyroscopes is an amount of error in the measured angular rate. This amount of error is called bias. When this error is integrated over time, the resulting error in the calculated platform attitude grows unbounded. Although, there are commercially available off-the-shelf (COTS) INS units, the size and cost of an INS is inversely proportional to the gyro bias. The larger and more expensive that an INS is; the smaller that the gyro bias is.

In order for a reduced cost INS to be suitable for systems such as satellite antenna or imaging stabilization applications; improvements to estimating the bias signal are needed.

SUMMARY OF THE INVENTION

A method for controlling a gyro-stabilized system is disclosed. The method comprises comparing an output of a gyroscope to a reference measurement; estimating a bias of the gyroscope based on the comparison using a Kalman filter, and adjusting a control output of the gyro-stabilized system with the estimated bias to maintain a position of the system.

By fusing gyro data with reference data, such as data from an inclinometer, differential GPS, or a peripheral INS, it is possible to effectively remove the bias from the gyro data, thereby achieving the required performance. For example, improved performance for antenna pointing and image stabilization applications through the use of a lower-cost INS may be achieved.

BRIEF DESCRIPTION OF THE DRAWINGS

Features of illustrative embodiments may be understood from the accompanying drawings in conjunction with the description, wherein.

DETAILED DESCRIPTION OF THE INVENTION

The following description relates to estimating and compensating for gyroscope bias in a servo system for a gyro-stabilized platform. A gyro-stabilized platform may be used to stabilize a payload on or in a reference system, where the reference system is subject to external disturbances that adjust the position or orientation of the reference system. The reference system may be a large ship, and the external disturbances may include the force of waves against the side of the ship.

In an embodiment, a gyro-stabilized platform is provided which includes three rate gyroscopes. As the position and/or orientation of the platform is adjusted; each of the three rate gyroscopes detects an angular velocity of the platform in one plane of freedom. For example, one rate gyroscope may detect an angular velocity corresponding to an adjustment in the heading of the platform, one rate gyroscope may detect an angular velocity corresponding to an adjustment in the pitch of the platform, and one rate gyroscope may detect an angular velocity corresponding to an adjustment in the yaw of the platform.

The three adjustments in angular velocities define a change in the position and/or the orientation of the platform in three planes of freedom. The change in position can be compensated for by adjusting the angular velocities of the platform in each plane of freedom to a corresponding degree in the opposite direction.

However, in gyroscopes there is an amount of error in the measured angular rate, referred to as a bias signal. When this error is integrated over time; the resulting error in the calculated adjustment of the position and/or the orientation of the gyro-stabilized platform by the controller grows unbounded, thereby generating drift.

In order to maintain stabilization, a bias signal is corrected by a controller of the servo system, where the controller adjusts the position of the platform to compensate for the bias. An advantage of the invention disclosed herein is that sufficient bias estimation is achieved to compensate for drift; thereby, allowing for the use of lower cost solid-state gyros.

An approach to estimating the inherent bias of rate gyros in order to subsequently adjust the position of a gyro-stabilized platform, is described in FIGS. 1-3.

Figure 1:
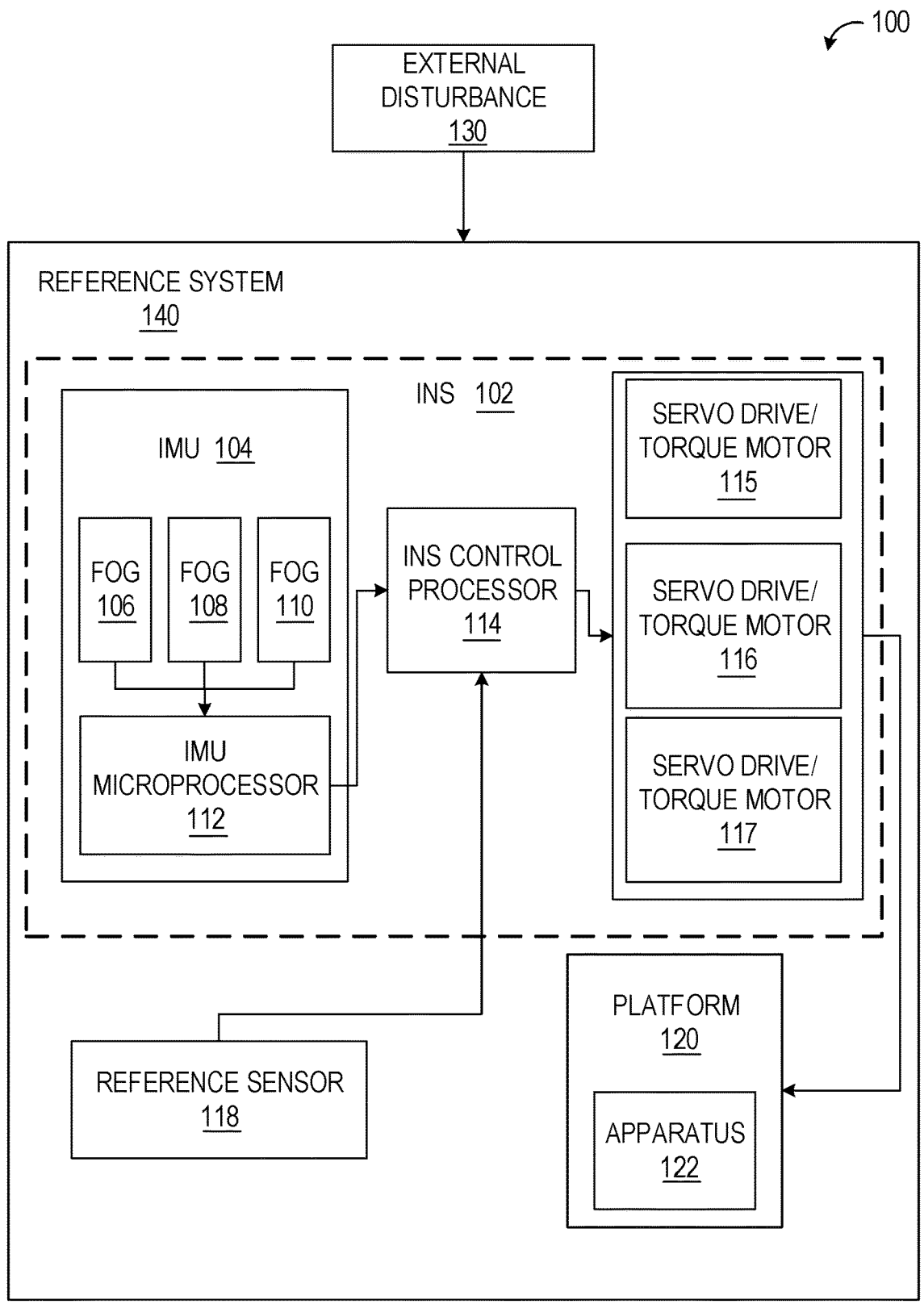
FIG. 1 is a block diagram of an inertial navigation system for a gyro-stabilized platform, in accordance with an embodiment of the present disclosure.

FIG. 1 shows a gyro-stabilized platform system 100, wherein an inertial navigation system (INS) 102 stabilizes a platform 120. The INS 102 and the platform 120 are positioned within a reference system 140, such that the effect of an external disturbance 130 on the reference system 140 is detected by the platform 120 and the INS 102. The reference system 140 may be a large ship, and the external disturbance 130 may include the force of waves on the side of the ship, currents in the water, the movement or repositioning of heavy elements on board the ship, vibration caused by equipment operating on board the ship, and so forth.

An apparatus 122 is positioned on the platform 120, the orientation of which is maintained in a fixed position or orientation regardless of a relative movement of the platform with respect to an external environment. The apparatus 122 may be an antenna of an onboard communication system installed upon the platform 120, where the orientation of the antenna is adjusted to compensate for the motion of the ship.

The INS 102 includes an inertial measurement unit (IMU) 104, which measures changes in the angular rate and/or orientation of the reference system in real time. In an embodiment, the IMU 104 includes a first fiber optic gyro (FOG) 106, a second fiber optic gyro (FOG) 108, and a third fiber optic gyro (FOG) 110. Each of FOGs 106, 108, and 110 measures a change in the angular rate and/or orientation of the reference system in a single plane of freedom, and outputs a signal value corresponding to the change. The magnitude of the signal value determines an angular velocity and the sign of the signal value determines a rotational direction.

The FOG 106 detects and outputs a signal value corresponding to the angular rotation of the platform 120 in the plane of freedom corresponding to the X axis (e.g., heading); the FOG 108 detects and outputs a signal value corresponding to the angular rotation of the platform 120 in the plane of freedom corresponding to the Y axis (e.g., pitch); and the FOG 110 detects and outputs a signal value corresponding to the angular rotation of the platform 120 in the plane of freedom corresponding to the Z axis (e.g., roll or yaw). It should be noted that in some embodiments, the IMU 104 may not measure changes in angular rate in three dimensions, and may include a lesser or greater number of FOGs.

The IMU 104 also includes a microprocessor 112 to receive the signal values of the measurements of the reference system 140 (and the platform 120) from the FOGs 106, 108, and 110 and outputs a corresponding signal value for the X, Y, and Z axis angular rotation rates. The IMU microprocessor 112 may perform other operations on the signal values received from the FOGs, such as amplifying, filtering, phase shifting, decreasing, and/or combining the signals.

The signal values pass through a low pass filter. The low pass filter reduces noise by attenuating signals with frequencies higher than a predetermined cutoff frequency. The output value of the microprocessor 112 is an input value into an INS control processor 114. The control processor 114 adjusts the position of the platform 120 to compensate for the change of position detected by the FOGs 106, 108, and 110 as part of a feedback control loop.

The apparatus 122 may be an antenna mounted on the platform 120, where the reference system 140 is a ship that is exposed to an external disturbance 130. As the external disturbance 130 adjusts the position and orientation of the reference system 140 during one execution cycle (e.g., a time interval when executable instructions are executed to determine controller states including inputs and outputs) of the feedback loop; the IMU 104 measures the angular rotation of the reference system 140 in three planes of freedom as a result of the external disturbance via the FOGS 106, 108, and 110.

The measurement of the adjustments to the angular rate of the reference system 140 is transmitted by the IMU microprocessor 112 to the INS control processor 114. The INS control processor 114 receives the signal values from the IMU microprocessor 112 and adjusts the signal values in accordance with a disturbance model. The output of the INS control processor 114 is the resulting signal value, which is received as input to actuate the three servo drive and torque motor assemblies 115, 116, and 117 in order to make a corresponding adjustment to the angular rotation of the platform 120.

Thus, the INS control processor 114 calculates and compensates for external forces applied to the reference system 140, the platform 120, and the apparatus 122 during one execution cycle of the feedback loop, using the angular rotation measurements taken by the IMU 104 during the previous cycle of the feedback loop.

The processors described herein may include a tangible and non-transitory computer readable medium in which programming instructions are stored. As used herein, tangible computer readable medium includes various types of computer readable storage and exclude merely propagating signals. The example methods and systems may be implemented using coded instruction stored on a non-transitory computer readable medium such as a flash memory, a read-only memory (ROM), a random-access memory (RAM), a cache, or any other storage media in which information is stored for any duration.

Memory and processors as referred to herein can be standalone or integrally constructed as part of various programmable devices. The memory of computer readable storage mediums includes volatile and non-volatile or removable and non-removable media for storage of electronic-formatted information such as computer readable program instructions or modules of computer readable program instructions, data, etc.

In order to estimate and compensate for the inherent bias of the FOGs 106, 108, and 110, the INS control processor 114 can receive numerous reference measurements of a reference sensor 118 as external reference aiding data to adjust the signals emitted by the FOGs. The reference aiding data is generated by one or more external apparatuses, which may be external to the gyroscope or external to the INS, that provide real-time position and/or orientation information. For example, the reference aiding data may include an inclinometer, where an angle of slope of the reference system 140 is measured with respect to the direction of gravity.

The reference aiding data may also include a differential global positioning system (DGPS), where fixed reference stations enhance the accuracy of a GPS satellite system.

The INS control processor 114 corrects the bias by adjusting the signals in accordance with a transfer function based on an optimized Kalman filter algorithm. For developing the Kalman filter algorithm used by the INS control processor 114; the initialization parameters of the Kalman filter are derived using an initial estimate of the mean value and increasing the variance to accommodate for uncertainties in order to optimize the response time of the Kalman filter in converging on accurate state estimates.

The accuracy of the INS 102 is improved by developing a statistical model for the gyros using the Allan Variance method. The Allan Variance statistic is a time domain analysis technique used to characterize underlying random noise processes in a set of data. Calculating the Allan Variance statistic for a set of data is described by Equation (1)

$$a(\tau) = \frac{1}{2(N-1)} \sum_{k=1}^{N-1} (\bar{y}_{k+1} - \bar{y}_k)^2 \quad (1)$$

where alpha is Allan deviation, or the square root of the Allan two-sample variance, N is the number of frequency samples used in variance, tau is the time length of each frequency estimate, and y is the fractional frequency.

As applied to gyros, the Allan Variance statistic can separate the two dominant noise components, Rate Random Walk (RRW) and Angle Random Walk (ARW), in order to obtain a contribution of each source. Estimates of Q and R, the spectral densities of RRW and ARW, are derived by plotting the Allan Variance statistic of a gyro on a log-log scale.

Figure 2:
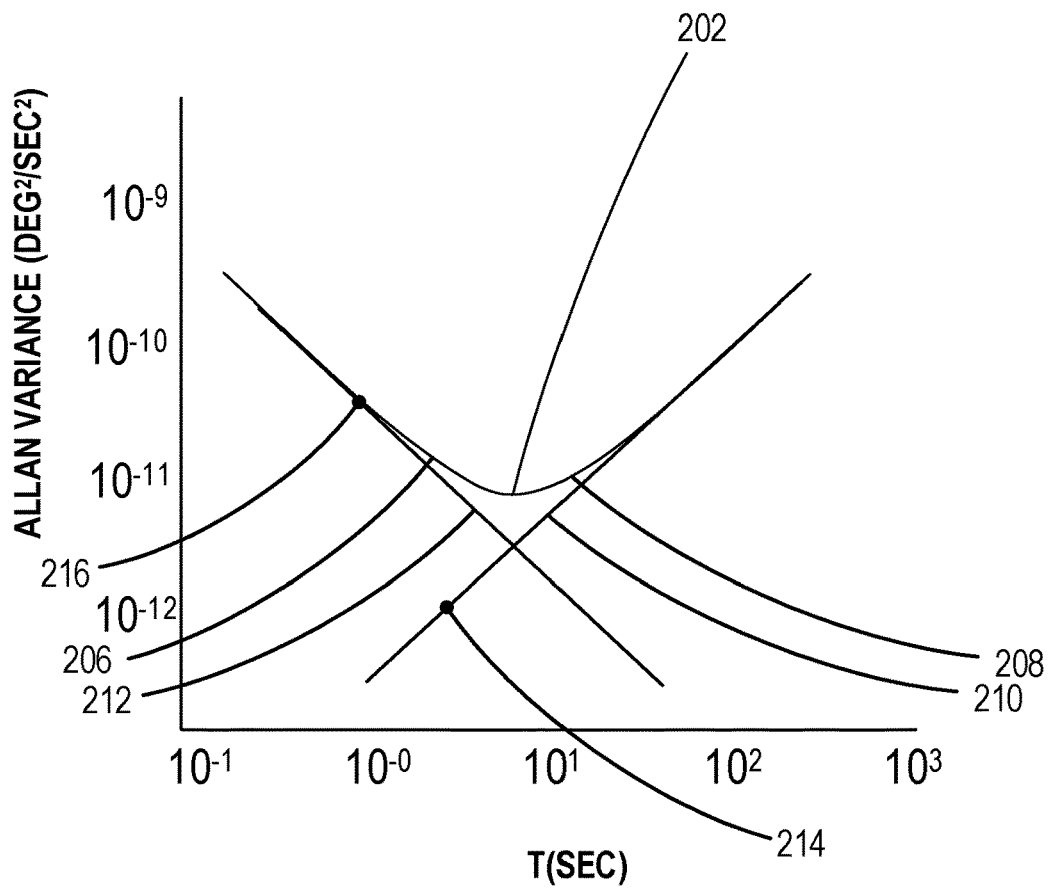
FIG. 2 is a graph illustrating a theoretical Allan Variance curve of a gyro.

Referring now to FIG. 2, an Allan Variance plot 200 for a gyro is shown, where a theoretical Allan Variance curve 202 is plotted on a log-log scale. The Allan Variance plot 200 includes a downward sloping linear section 206 and an upward sloping linear section 208. The value of the slope of the linear section 206 is determined by the expression R/τ. The value of the slope of the linear section 208 of the Allan Variance curve is determined by the expression Qτ/3. Thus, the values of Q and R are estimated by extrapolating the linear portions of the theoretical Allan Variance curve 202, to find the value of an upward sloping line 210 at τ=3, and the value of downward sloping line 212 at τ=1, respectively. The value of Q is shown in FIG. 2 at point 214, approximately 1e-12, and the value of R is shown at point 216, approximately 3.33e-11.

It is noted that with respect to the approach shown in FIG. 2, the accuracy of the estimate of the gyro RRW component Q can be improved using an algorithm for determining the best linear unbiased estimator. This incorporates the theoretical variance of the Allan Variance points as well as the co-variance between the different Allan Variance points, and may reduce the error from the actual value of Q significantly over the traditional approach shown in FIG. 2. The result of using this algorithm is described in relation to FIG. 3.

Returning to FIG. 1, using the derived statistical model of the gyro as described above, an optimized Kalman filter is developed for a single axis gyro, expanded for 3-D INS operation, and programmatically coded into the INS control processor 114.

The Kalman filter uses noisy variable measurements as well as a dynamic system model to produce variable estimates that are often more accurate than the measurements alone. As described herein, the measurements made (e.g., the reference measurement sensors 118) are angular attitudes of the gyros, θ̃. For example, this measurement could be generated by an inclinometer, differential GPS, or a peripheral INS. The dynamic system model for a single axis gyro is expressed as Equation (2)

$$\begin{bmatrix} \dot{\theta} \\ \dot{B} \end{bmatrix} = \begin{bmatrix} 0 & -1 \\ 0 & 0 \end{bmatrix} \begin{bmatrix} \theta \\ B \end{bmatrix} + \begin{bmatrix} 1 \\ 0 \end{bmatrix} \omega + \begin{bmatrix} \eta_v \\ \eta_u \end{bmatrix} \quad (2)$$

where the two state variables are angular attitude, θ and gyro bias, B.

The noise matrix in the above dynamic model is broken into the two dominant sources of gyro noise, ARW and RRW. The ARW component, $\eta_v$, is on the order of R. The RRW component, $\eta_u$, is on the order of Q. For digital implementation, the system model is converted to discrete-time, using the form shown in Equation (3) and Equation (4)

$$x_{k+1} = \Phi_k x_k + \Gamma_k u_k + Y_k w_k \quad (3)$$

$$\tilde{y}_k = H_k x_k + v_k \quad (4)$$

Thus, the discrete-time dynamic system model for a gyro is expressed in Equation (5) and Equation (6)

$$\begin{bmatrix} \theta \\ B \end{bmatrix}_{k+1} = \begin{bmatrix} 1 & -dt \\ 0 & 1 \end{bmatrix} \begin{bmatrix} \theta \\ B \end{bmatrix}_k + \begin{bmatrix} 1 \\ 0 \end{bmatrix} \omega_k \quad (5)$$

$$\tilde{\theta}_k = \begin{bmatrix} 1 & 0 \end{bmatrix} \begin{bmatrix} \theta \\ B \end{bmatrix}_k + v_k \quad (6)$$

Before beginning the Kalman filter algorithm, the state estimate matrix, covariance matrix, process noise covariance matrix, and measurement noise covariance matrix must be initialized. The state estimate matrix is initialized in accordance with Equation (7)

$$\hat{x}_0 = \begin{bmatrix} \tilde{\theta}_0 \\ 0 \end{bmatrix} \quad (7)$$

where θ̃ is the initial angular attitude measurement.

The covariance matrix "p" is initialized in accordance with Equation (8)

$$P = \begin{bmatrix} poa & 0 \\ 0 & pog \end{bmatrix} \quad (8)$$

where "poa" is a measure of the initial accuracy of the angular attitude state estimate, and "pog" is a measure of the initial accuracy of the bias state estimate. In this example, since the gyro is rated for a bias of 1°/hour, pog is initialized as 1/3600°/sec.

The process noise covariance matrix Q is expressed as Equation (9)

$$Q = \begin{bmatrix} \sigma_v^2 dt + \frac{1}{3}\sigma_u^2 dt^3 & -\frac{1}{2}\sigma_u^2 dt^2 \\ -\frac{1}{2}\sigma_u^2 dt^2 & \sigma_u^2 dt \end{bmatrix} \quad (9)$$

where $\sigma_v^2$ and $\sigma_u^2$ are the ARW and RRW variances, R and Q respectively. It should be appreciated that these are not to be confused with the R and Q noise variance matrices of the Kalman filter.

The measurement noise covariance matrix, R, is expressed as Equation (10)

$$R = \sigma_n^2 \quad (10)$$

where $\sigma_n^2$ is the variance of the measurement noise. The measurement noise covariance matrix R is only 1×1, as one variable is being measured.

After the matrices have been initialized, the Kalman filter algorithm begins operation, where Equations (11) through (15) are executed each time that a new measurement is recorded. First, the gain matrix K is calculated using the covariance matrix P and the measurement noise matrix R, as shown in Equation (11):

$$K_k = P_k H_k^T [H_k P_k H_k^T + R_k]^{-1} \quad (11)$$

Next, the covariance matrix P and the state estimate matrix x are updated based on the calculated gain, and the value of the measured variable. These calculations are shown in Equations (12) and (13)

$$P_k^+ = [1 - K_k H_k] P_k^- \quad (12)$$

$$\hat{x}_k^+ = \hat{x}_k^- + K_k [\tilde{y}_k - H_k x_k^-] \quad (13)$$

Finally, the state estimate matrix $\hat{x}$ and the covariance matrix P are propagated in accordance with the discrete-time dynamic model of the system, as shown in Equations (14) and (15):

$$\hat{x}_{k+1}^- = \Phi_k \hat{x}_k^+ + \Gamma_k \mu_k \quad (14)$$

$$P_{k+1}^- = \Phi_k P_k^+ \Phi_k^T + Y_k Q_k Y_k^T \quad (15)$$

In order to get bias free roll, pitch, and yaw data from an INS (e.g., the INS 102 of FIG. 1), the Kalman filter algorithm is expanded for three-dimensional operation, resulting in a Kalman filter with six state variables, expressed as Equation (16)

$$\hat{x} = [\phi \theta \psi B_x B_y B_z]^T \quad (16)$$

where Ø is roll, θ is pitch, φ is yaw, and $B_x$, $B_y$, and $B_z$ are the gyro bias estimates.

Because the gyros output rotation measurements with respect to the local coordinate frame of the INS, the measurements are transformed into a global coordinate frame using the Euler-Angle convention. The Z-Y-X Euler Angle transformation matrix for measured rotations is used. Differentiating the Euler Angle rotation transformation matrix gives the Euler Angle Rate transform matrix, E, expressed as Equation (17)

$$E = \begin{bmatrix} 1 & \sin(\phi)\tan(\theta) & \cos(\phi)\tan(\theta) \\ 0 & \cos(\phi) & -\sin(\phi) \\ 0 & \sin(\phi)/\cos(\theta) & \cos(\phi)/\cos(\theta) \end{bmatrix} \quad (17)$$

Using this convention, the global rates of roll, pitch, and yaw are calculated from the local gyro-measured rotations via the Equation (18)

$$\begin{bmatrix} \dot{\phi} \\ \dot{\theta} \\ \dot{\psi} \end{bmatrix} = \begin{bmatrix} 1 & \sin(\phi)\tan(\theta) & \cos(\phi)\tan(\theta) \\ 0 & \cos(\phi) & -\sin(\phi) \\ 0 & \sin(\phi)/\cos(\theta) & \cos(\phi)/\cos(\theta) \end{bmatrix} \begin{bmatrix} \omega_x + B_x + \eta_{vx} \\ \omega_y + B_y + \eta_{vy} \\ \omega_z + B_z + \eta_{vz} \end{bmatrix} \quad (18)$$

Gyro bias states are still only dependent upon $\eta_u$, as shown in Equation (19)

$$\begin{bmatrix} \dot{B}_x \\ \dot{B}_y \\ \dot{B}_z \end{bmatrix} = \begin{bmatrix} \eta_{ux} \\ \eta_{uy} \\ \eta_{uz} \end{bmatrix} \quad (19)$$

Combining Equation (18) and Equation (19), the dynamic system model for this INS Kalman filter is expressed as follows:

$$\begin{bmatrix} \dot{\phi} \\ \dot{\theta} \\ \dot{\psi} \\ \dot{B}_x \\ \dot{B}_y \\ \dot{B}_z \end{bmatrix} = \begin{bmatrix} O & E \\ O & O \end{bmatrix} \begin{bmatrix} \phi \\ \theta \\ \psi \\ B_x \\ B_y \\ B_z \end{bmatrix} + \begin{bmatrix} E & O \\ O & O \end{bmatrix} \begin{bmatrix} \omega_x \\ \omega_y \\ \omega_z \\ 0 \\ 0 \\ 0 \end{bmatrix} + \begin{bmatrix} E & O \\ O & I \end{bmatrix} \begin{bmatrix} \eta_{vx} \\ \eta_{vy} \\ \eta_{vz} \\ \eta_{ux} \\ \eta_{uy} \\ \eta_{uz} \end{bmatrix} \quad (20)$$

where 'O' represents a 3×3 zero matrix, and 'I' represents a 3×3 identity matrix.

Converting this dynamic system model into discrete-time form yields the following equation:

$$\begin{bmatrix} \phi \\ \theta \\ \psi \\ B_x \\ B_y \\ B_z \end{bmatrix}_{k+1} = \begin{bmatrix} I & Edt \\ O & I \end{bmatrix} \begin{bmatrix} \phi \\ \theta \\ \psi \\ B_x \\ B_y \\ B_z \end{bmatrix}_k + \begin{bmatrix} Edt & O \\ O & Idt \end{bmatrix} \begin{bmatrix} \omega_x \\ \omega_y \\ \omega_z \\ 0 \\ 0 \\ 0 \end{bmatrix}_k + \begin{bmatrix} Edt & O \\ O & Idt \end{bmatrix} \begin{bmatrix} \eta_{vx} \\ \eta_{vy} \\ \eta_{vz} \\ \eta_{ux} \\ \eta_{uy} \\ \eta_{uz} \end{bmatrix}_k \quad (21)$$

The covariance matrix, process noise matrix, and measurement noise matrix are then also expanded for 3-D operation. The initialization of the covariance matrix is defined as follows:

$$P = \begin{bmatrix} poa & 0 & 0 & 0 & 0 & 0 \\ 0 & poa & 0 & 0 & 0 & 0 \\ 0 & 0 & poa & 0 & 0 & 0 \\ 0 & 0 & 0 & pog & 0 & 0 \\ 0 & 0 & 0 & 0 & pog & 0 \\ 0 & 0 & 0 & 0 & 0 & pog \end{bmatrix} \quad (22)$$

The process noise matrix is defined as follows:

$$Q = \begin{bmatrix} A & 0 & 0 & C & 0 & 0 \\ 0 & A & 0 & 0 & C & 0 \\ 0 & 0 & A & 0 & 0 & C \\ C & 0 & 0 & B & 0 & 0 \\ 0 & C & 0 & 0 & B & 0 \\ 0 & 0 & C & 0 & 0 & B \end{bmatrix} \quad (23)$$

where $A = \sigma_v^2 dt + \frac{1}{3}\sigma_u^2 dt^3$, $B = \sigma_u^2 dt$, and $C = -\frac{1}{2}\sigma_u^2 dt^2$.

The measurement noise matrix is defined as follows:

$$R = \begin{bmatrix} \sigma_n^2 & 0 & 0 \\ 0 & \sigma_n^2 & 0 \\ 0 & 0 & \sigma_n^2 \end{bmatrix} \quad (24)$$

As stated above, the Kalman filter is programmatically coded into the INS control processor 114 to allow for real-time execution of this algorithm. In this way, the INS 102 generates estimates of the inherent bias of the FOG rate gyros 106, 108, and 110, which are fed back into the INS 102 as part of a feedback control loop to calibrate and adjust the angular velocities generated by forces applied to the apparatus 122 as result of the external disturbance 130, thus reducing drift over time.

Figure 3:
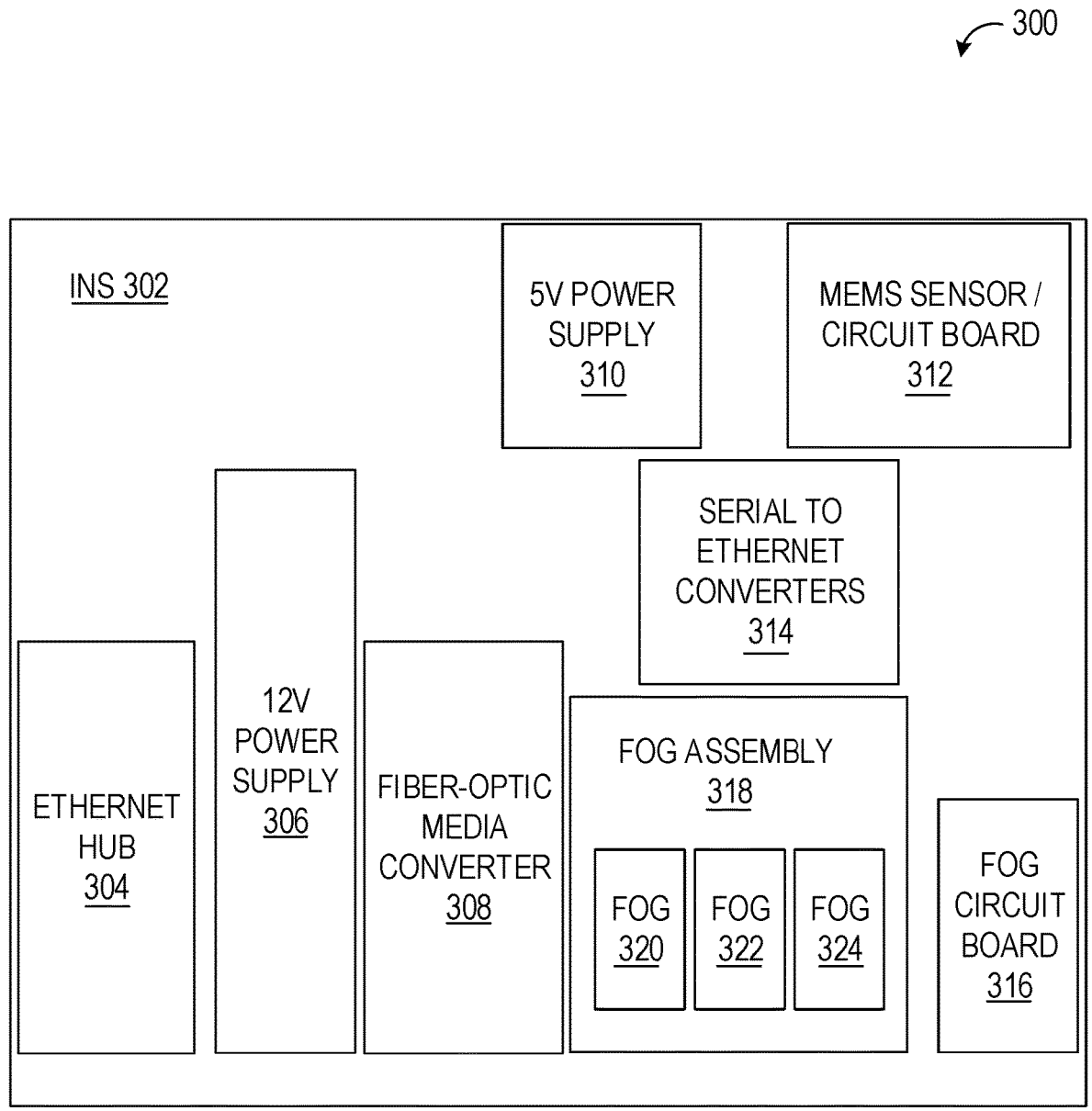
FIG. 3 is a block diagram that shows an arrangement of components of an Inertial Navigation System (INS), in accordance with an embodiment of the present disclosure.

Turning now to FIG. 3, a block diagram 300 illustrates an arrangement of components of an INS system 302. The INS system 302 may be the same as or similar to the INS 102 of the gyro-stabilized platform system 100 of FIG. 1. For example, the INS system 302 may be used in a stabilization platform for a satellite antenna on a ship.

In an embodiment, the INS system 302 includes a FOG assembly 318, which in turn includes three solid-state Fiber Optic Gyros (FOGS) 320, 322, and 324. Although depicted in parallel in FIG. 3, it is noted that the FOGS 320, 322, and 324 are arranged in an orthogonal relationship to each other, such that each FOG senses a velocity in a single plane of freedom. For example, the FOG 320 may be arranged to sense an angular velocity corresponding to the heading of the stabilized apparatus; the FOG 322 may be arranged to sense an angular velocity corresponding to the pitch of the stabilized apparatus; and the FOG 324 may be arranged to sense an angular velocity corresponding to the yaw of the stabilized apparatus.

In other embodiments, the FOG 320 may be arranged to sense an angular velocity corresponding to the pitch of the stabilized apparatus, and the FOGS 322 and 324 may be arranged to sense angular velocities corresponding to the heading and the yaw of the stabilized apparatus. It should be appreciated that the examples provided herein are for illustrative purposes, and the FOGS 320, 322, and 324 may be arranged in any orthogonal arrangement such that heading, pitch, and yaw are sensed by the FOGS without departing from the scope of this disclosure.

The FOG assembly 318 includes a microprocessor (not depicted) for processing the signals sensed by the FOGS 320, 322, and 324. The FOG assembly 318 and microprocessor are powered by a 12V power supply 306. The output signals of the FOGS 320, 322, and 324 are electrically connected via a circuit board 316, which includes a separate microprocessor. The FOG circuit board 316 and corresponding microprocessor are powered by a 5V power supply 310.

In order to estimate the inherent bias of the solid-state FOGS 320, 322, and 324, as described above in relation to FIGS. 1 and 2, the microprocessor of the FOGS circuit board 316 receives external aiding data signals (e.g., the reference sensors 118 of INS 102), which the microprocessor compares to the output signals of the FOG assembly 318 to generate an error value. The external aiding data may be received over a network as TCP/IP packets via an Ethernet hub 304.

For example, for a gyro-stabilized system (e.g., the gyro-stabilized system 100 of FIG. 1) on board a ship, the INS 302 may receive external aiding data via the Ethernet hub 304 from a differential GPS located outside the gyro-stabilized system over a local area network (LAN) operating on the ship. Additionally and/or alternatively, the INS 302 may receive external aiding data from a peripheral INS located outside the gyro-stabilized system over a local area network (LAN) operating on the ship.

The external aiding data received via the Ethernet hub 304 is connected to the FOGS circuit board 316 via one or more serial-to-Ethernet converters 314. The external aiding data received via the Ethernet hub 304 is also converted to fiber-optic media via a fiber-optic media converter 308.

In addition to external aiding data received over a network via the Ethernet hub 304; external aiding data may be received by the FOGS circuit board 316 from one or more sensors arranged within the housing of the INS 302. For example, external aiding data may be received from a circuit board connected to an inclinometer in the form of a MEMS sensor 312, which outputs a signal indicating the pitch of a gyro-stabilized apparatus. As described above, the output signal of the MEMS sensor 312 may be compared with the output signal of a FOG that measures the pitch of the gyro-stabilized apparatus in order to generate an error value which may be used to adjust the gyro-stabilized apparatus in order to compensate for bias in the FOG.

It will be understood that many additional changes in the details, materials, steps and arrangement of parts, which have been herein described and illustrated in order to explain the nature of the invention, may be made by those skilled in the art within the principle and scope of the expressed in the appended claims.

What is claimed is:

1. A method for controlling a gyro-stabilized platform including an inertial navigation system with an inertial measurement unit, said method comprising the steps of:

measuring changes in an angular rate of the platform with the inertial measurement unit;

determining an orientation of the reference system with the inertial measurement unit;

outputting at least one signal value based on said determining the orientation step;

filtering the at least one signal value through a low pass filter by estimating a bias based on a comparison using a Kalman filter as the low pass filter wherein parameters are based on an Allan Variance statistical model as a time domain analysis to characterize underlying noise processes such that a Rate Random Walk noise component and an Angle Random Walk noise component are separated for obtaining a contribution of each noise component by:

calculating the Allan Variance statistical model for a set of data from $$a(\tau) = \frac{1}{2(N-1)} \sum_{k=1}^{N-1} (\bar{y}_{k+1} - \bar{y}_k)^2$$

where alpha is a square root of an Allen two-sample variance, N is the number of frequency expressing a dynamic system model as $$\begin{bmatrix} \dot{\theta} \\ \dot{B} \end{bmatrix} = \begin{bmatrix} 0 & -1 \\ 0 & 0 \end{bmatrix} \begin{bmatrix} \theta \\ B \end{bmatrix} + \begin{bmatrix} 1 \\ 0 \end{bmatrix} \omega + \begin{bmatrix} \eta_v \\ \eta_u \end{bmatrix};$$

where the variables are angular attitude, θ and bias, B, the Angle Random Walk noise component, $\eta_v$, is on the order of R, the Rate Random Walk noise component, $\eta_u$, is on the order of Q;

converting the dynamic system model to discrete-time by the forms $$x_{k+1} = \Phi_k x_k + \Gamma_k u_k + Y_k w_k$$

$$\tilde{y}_k = H_k x_k + v_k;$$

expressing the discrete-time dynamic system model by $$\begin{bmatrix} \theta \\ B \end{bmatrix}_{k+1} = \begin{bmatrix} 1 & -dt \\ 0 & 1 \end{bmatrix} \begin{bmatrix} \theta \\ B \end{bmatrix}_k + \begin{bmatrix} 1 \\ 0 \end{bmatrix} \omega_k$$

$$\bar{\theta}_k = \begin{bmatrix} 1 & 0 \end{bmatrix} \begin{bmatrix} \theta \\ B \end{bmatrix}_k + v_k;$$

initializing an estimate matrix by $$\hat{x}_0 = \begin{bmatrix} \tilde{\theta}_0 \\ 0 \end{bmatrix}$$

where $\tilde{\theta}$ is the initial angular attitude measurement;

initializing a covariance matrix "p" by $$P = \begin{bmatrix} poa & 0 \\ 0 & pog \end{bmatrix}$$

where "poa" is a measure of the initial accuracy of an angular attitude estimate, and "pog" is a measure of the initial accuracy of a bias estimate;

calculating a process noise covariance matrix Q as $$Q = \begin{bmatrix} \sigma_v^2 dt + \frac{1}{3}\sigma_u^2 dt^3 & -\frac{1}{2}\sigma_u^2 dt^2 \\ -\frac{1}{2}\sigma_u^2 dt^2 & \sigma_u^2 dt \end{bmatrix}$$

where $\sigma_v^2$ and $\sigma_u^2$ are the Angle Random Walk and Rate Random Walk variances, R and Q respectively;

expressing a measurement noise covariance matrix, R, as $R = \sigma_n^2$ where $\sigma_n^2$ is the variance of the measurement noise;

calculating a gain matrix K using a covariance matrix P and a measurement noise matrix R, as $K_k = P_k H_k^T [H_k P_k H_k^T + R_k]^{-1}$;

updating the covariance matrix P and an estimate matrix $\hat{x}$ based on calculated gain and a value of the measured variable by $P_k^+ = [1 - K_k H_k] P_k^-$ $\hat{x}_k^+ = \hat{x}_k^- + K_k[\tilde{y}_k - H_k x_k^-]$;

propagating the estimate matrix $\hat{x}$ and the covariance matrix P in accordance with a discrete-time dynamic model as $\hat{x}_{k+1} = \Phi_k \hat{x}_k^+ + \Gamma_k u_k$ $P_{k+1}^- = \Phi_k P_k^+ \Phi_k^T + Y_k Q_k Y_k^T$;

expanding for three-dimensional operation, resulting in the Kalman filter with six variables, expressed as $\hat{x} = [\phi \theta \psi B_x B_y B_z]^T$ where $\varnothing$ is roll, $\theta$ is pitch, $\varphi$ is yaw, and $B_x$, $B_y$, and $B_z$ are gyro bias estimates;

differentiating an Euler Angle rotation transformation matrix for an Euler Angle Rate transform matrix, E, expressed as $$E = \begin{bmatrix} 1 & \sin(\phi)\tan(\theta) & \cos(\phi)\tan(\theta) \\ 0 & \cos(\phi) & -\sin(\phi) \\ 0 & \sin(\phi)/\cos(\theta) & \cos(\phi)/\cos(\theta) \end{bmatrix}$$;

calculating global rates of roll, pitch, and yaw from $$\begin{bmatrix} \dot{\phi} \\ \dot{\theta} \\ \dot{\psi} \end{bmatrix} = \begin{bmatrix} 1 & \sin(\phi)\tan(\theta) & \cos(\phi)\tan(\theta) \\ 0 & \cos(\phi) & -\sin(\phi) \\ 0 & \sin(\phi)/\cos(\theta) & \cos(\phi)/\cos(\theta) \end{bmatrix} \begin{bmatrix} \omega_x + B_x + \eta_{vx} \\ \omega_y + B_y + \eta_{vy} \\ \omega_z + B_z + \eta_{vz} \end{bmatrix}$$;

determining gyro bias states from $\eta_u$, as $$\begin{bmatrix} \dot{B}_x \\ \dot{B}_y \\ \dot{B}_z \end{bmatrix} = \begin{bmatrix} \eta_{ux} \\ \eta_{uy} \\ \eta_{uz} \end{bmatrix}$$;

combining the dynamic model as $$\begin{bmatrix} \dot{\phi} \\ \dot{\theta} \\ \dot{\psi} \\ \dot{B}_x \\ \dot{B}_y \\ \dot{B}_z \end{bmatrix} = \begin{bmatrix} O & E \\ O & O \end{bmatrix} \begin{bmatrix} \phi \\ \theta \\ \psi \\ B_x \\ B_y \\ B_z \end{bmatrix} + \begin{bmatrix} E & O \\ O & O \end{bmatrix} \begin{bmatrix} \omega_x \\ \omega_y \\ \omega_z \\ 0 \\ 0 \\ 0 \end{bmatrix} + \begin{bmatrix} E & O \\ O & I \end{bmatrix} \begin{bmatrix} \eta_{vx} \\ \eta_{vy} \\ \eta_{vz} \\ \eta_{ux} \\ \eta_{uy} \\ \eta_{uz} \end{bmatrix}$$

where 'O' represents a zero matrix, and 'I' represents an identity matrix;

converting the dynamic system model into a discrete-time form to yield $$\begin{bmatrix} \phi \\ \theta \\ \psi \\ B_x \\ B_y \\ B_z \end{bmatrix}_{k+1} = \begin{bmatrix} I & Edt \\ O & I \end{bmatrix} \begin{bmatrix} \phi \\ \theta \\ \psi \\ B_x \\ B_y \\ B_z \end{bmatrix}_k + \begin{bmatrix} Edt & O \\ O & Idt \end{bmatrix} \begin{bmatrix} \omega_x \\ \omega_y \\ \omega_z \\ 0 \\ 0 \\ 0 \end{bmatrix}_k + \begin{bmatrix} Edt & O \\ O & Idt \end{bmatrix} \begin{bmatrix} \eta_{vx} \\ \eta_{vy} \\ \eta_{vz} \\ \eta_{ux} \\ \eta_{uy} \\ \eta_{uz} \end{bmatrix}$$

defining initialization of the covariance matrix as $$P = \begin{vmatrix} poa & 0 & 0 & 0 & 0 & 0 \\ 0 & poa & 0 & 0 & 0 & 0 \\ 0 & 0 & poa & 0 & 0 & 0 \\ 0 & 0 & 0 & pog & 0 & 0 \\ 0 & 0 & 0 & 0 & pog & 0 \\ 0 & 0 & 0 & 0 & 0 & pog \end{vmatrix}$$;

defining a process noise matrix as $$Q = \begin{vmatrix} A & 0 & 0 & C & 0 & 0 \\ 0 & A & 0 & 0 & C & 0 \\ 0 & 0 & A & 0 & 0 & C \\ C & 0 & 0 & B & 0 & 0 \\ 0 & C & 0 & 0 & B & 0 \\ 0 & 0 & C & 0 & 0 & B \end{vmatrix}$$

where $A = \sigma_v^2 dt + \frac{1}{3}\sigma_u^2 dt^3$, $B = \sigma_u^2 dt$, and $C = -\frac{1}{2}\sigma_u^2 dt^2$;

defining the measurement noise matrix as $$R = \begin{bmatrix} \sigma_n^2 & 0 & 0 \\ 0 & \sigma_n^2 & 0 \\ 0 & 0 & \sigma_n^2 \end{bmatrix};$$

and
generating estimates of inherent bias of the first fiber optic gyroscope, second fiber optic gyroscope and third fiber optic gyroscope;
adjusting the at least one signal value in accordance with a disturbance model subsequent to and in conjunction with said filtering the at least one signal value through a low pass filter step;
inputting the at least one signal value to three servo drive and torque motor assembles to adjust an angular rotation of the platform; and
maintaining a position of the gyro-stabilized platform based on said inputting and adjusting step.

* * * * *